United States Patent
Gutierrez et al.

(10) Patent No.: US 6,889,956 B2
(45) Date of Patent: May 10, 2005

(54) POPPET VALVE BUSHING WITH TOLERANCE RING

(75) Inventors: Carlos A. Gutierrez, Pittsford, NY (US); Raul A. Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 69 days.

(21) Appl. No.: 10/374,552

(22) Filed: Feb. 25, 2003

(65) Prior Publication Data

US 2004/0031943 A1 Feb. 19, 2004

Related U.S. Application Data

(60) Provisional application No. 60/403,986, filed on Aug. 16, 2002.

(51) Int. Cl.[7] .............................................. F16K 31/44
(52) U.S. Cl. ........................................ 251/214; 384/215
(58) Field of Search ........................ 251/214; 384/215; 277/630, 637, 638, 641, 644

(56) References Cited

U.S. PATENT DOCUMENTS

| | | | |
|---|---|---|---|
| 5,439,928 A | * | 8/1995 | Karjalainen et al. ........ 514/400 |
| 6,213,447 B1 | | 4/2001 | Bircann et al. |
| 6,230,742 B1 | | 5/2001 | Bircann |
| 6,288,878 B1 | * | 9/2001 | Misso et al. ............. 360/264.3 |
| 6,604,542 B1 | | 8/2003 | Bircann et al. |
| 6,748,774 B2 | * | 6/2004 | Dubay et al. ................ 70/187 |

* cited by examiner

*Primary Examiner*—Edward K. Look
*Assistant Examiner*—John K. Fristoe, Jr
(74) *Attorney, Agent, or Firm*—Patrick M. Griffin

(57) ABSTRACT

A pintle bushing assembly for a poppet valve assembly including a tolerance ring which is disposable between the pintle bushing and a bore in the body of the valve to both seal and center the bushing in the bore. The tolerance ring includes a plurality of radially-extending dimples which are deformable during assembly such that the valve pintle can be aligned coaxially with the valve seat under all conditions. An axial flange on the tolerance ring is sealed against axial surfaces of the valve body adjacent the bore and a flange on the bushing to prevent leakage past the bushing.

8 Claims, 2 Drawing Sheets

POPPET VALVE BUSHING WITH TOLERANCE RING

RELATIONSHIP TO OTHER APPLICATIONS AND PATENTS

The present invention claims priority from U.S. Provisional Patent Application, Ser. No. 60/403,986, filed Aug. 16, 2002.

TECHNICAL FIELD

The present invention relates to poppet valve assemblies; more particularly, to pintle bushings for poppet valves; and most particularly, to a pintle bushing assembly including a tolerance ring.

BACKGROUND OF THE INVENTION

Poppet-type valve assemblies are well known. Such a valve assembly typically includes a valve body having a seated port and a pintle having a valve head for closeably mating with the seat. The pintle is axially reciprocable through a bore formed coaxially with the seat in a wall of the valve body opposite the seat. The bore may be provided with a press-fit sleeve bushing for the pintle, the bushing being formed from a durable, low-friction material different from the material of the valve body and the pintle. Press-fitting the bushing serves two purposes: to seal against leakage around the bushing and to center the pintle in the bore.

Press-fitting requires very tight manufacturing tolerances in the valve bore, the seat, and the bushing, which results in high manufacturing cost, difficult quality control, and complexity. In addition, a tight press-fit can generate large assembly forces which can distort the components and misalign the seat and bore, causing increased manufacturing waste or later leakage and premature failure.

In some applications, poppet valves are exposed to a wide range of temperatures during operation. One such application is as an exhaust gas recirculation (EGR) valve for an internal combustion engine, wherein operating temperatures may range between, for example, −40° C. and 750° C. Because the valve body and bushing are formed of different materials, thermal stresses may add to the assembly stresses which can result in thermal fatigue and/or render the bushing free in the bore, either of which results in failure of the EGR valve.

What is needed is a means for relieving the tolerance requirements of a valve body bore and valve bushing while maintaining sealing of the bushing to the body and centering of the bushing in the bore.

It is a principal object of the present invention to relieve the tolerance requirements of a valve body bore and valve bushing while maintaining sealing of the bushing to the body and centering of the bushing in the bore.

It is a further object of the invention to provide such relief and centering over the range of operating temperatures experienced by the valve.

It is a still further object of the invention to reduce the cost and complexity of manufacture of a poppet valve assembly.

SUMMARY OF THE INVENTION

Briefly described, a pintle bushing assembly for a poppet valve in accordance with the invention includes a tolerance ring which is disposed between the pintle bushing and a bore in the body of the valve to both seal and center the bushing in the bore. The tolerance ring includes a plurality of radially-extending dimples which are deformable during assembly and thermal use stress of the bushing such that the valve pintle can be aligned coaxially with the valve seat despite misalignment or eccentricity of the bore. An axial flange on the tolerance ring is sealed against axial surfaces of the valve body adjacent the bore and a flange on the bushing to prevent leakage past the bushing.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
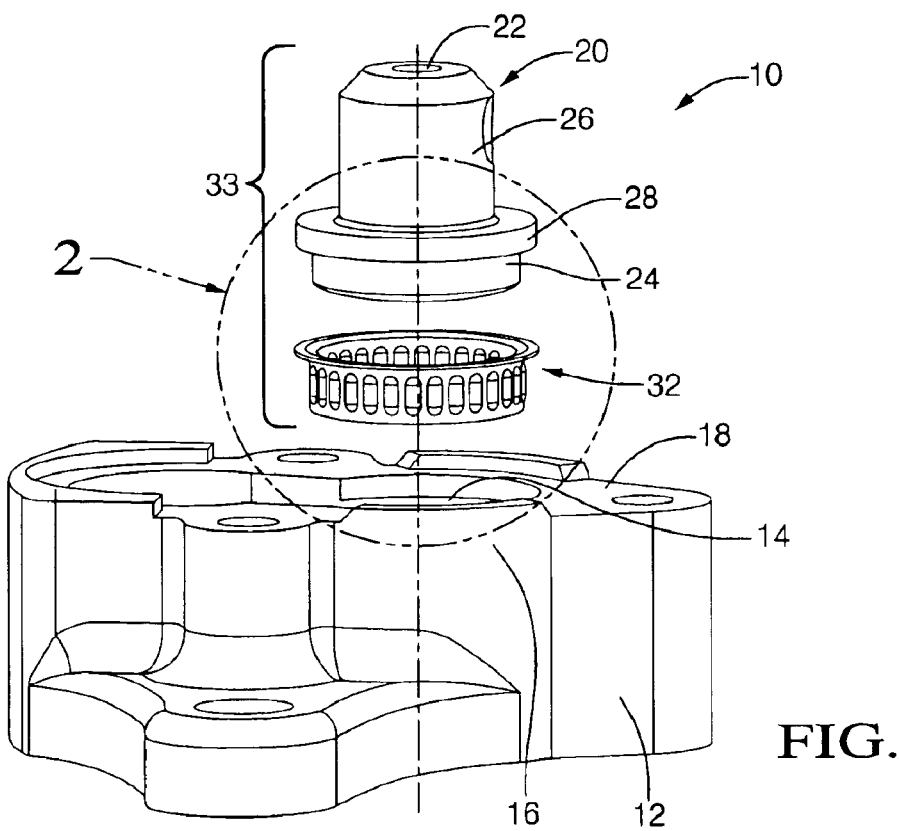
FIG. 1 is an exploded elevational view showing a valve body, tolerance ring, and valve pintle in accordance with the invention.
Figure 2:
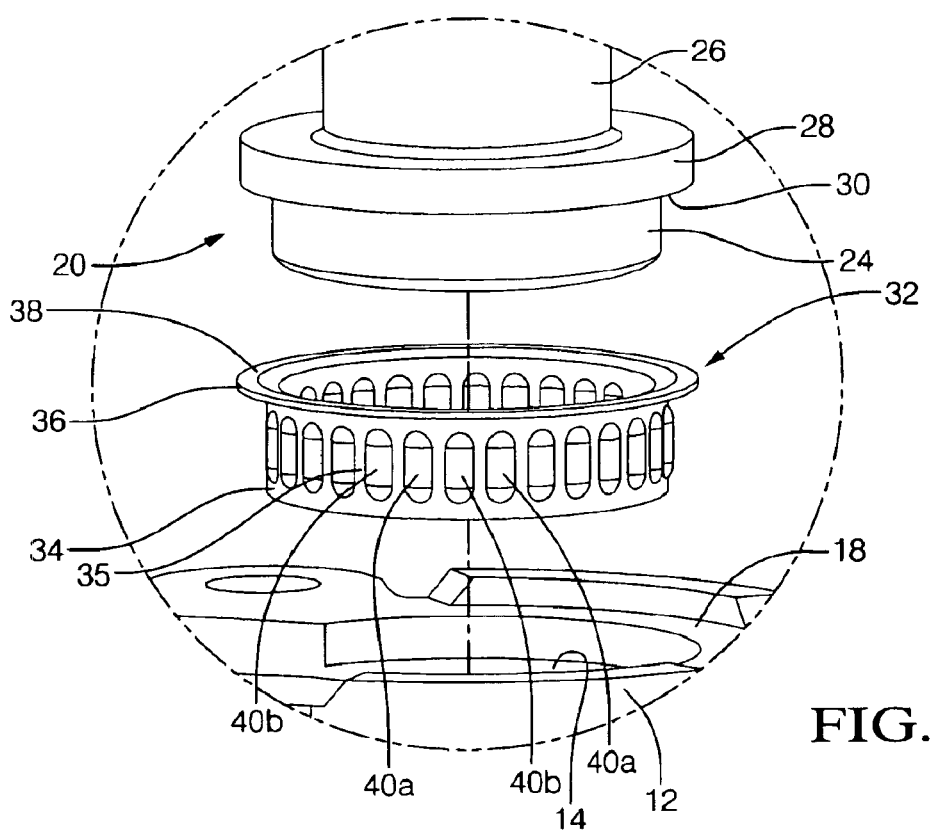
FIG. 2 is a detailed view of a portion of FIG. 1 taken within circle 2.
Figure 3:
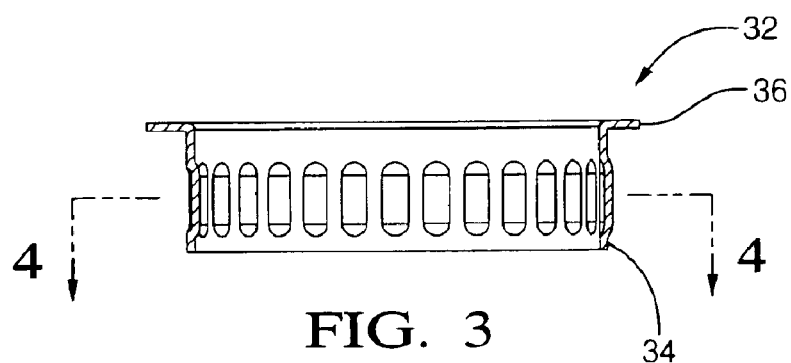
FIG. 3 is an elevational cross-sectional view of a tolerance ring in accordance with the invention.

Referring to FIGS. 1 through 3, a partial poppet valve assembly 10, for example, an exhaust gas recirculation valve assembly for an internal combustion engine, includes a valve body 12 having a bore 14 in a wall 16 of body 12. Bore 14 is generally coaxial with a valve seat (not visible) surrounded by a planar axial surface 18. A bushing 20 has an axial bore 22 for receiving and reciprocably supporting a valve pintle (not shown). Bushing 20 is generally cylindrical, having a first portion 24 for extending into bore 14 and a second portion 26 extending away from body 12 for supporting the pintle. A radial flange 28 therebetween has an axial face 30 parallel with axial surface 18.

Disposed between body 12 and bushing 20 is a tolerance ring 32. Ring 32 has a generally cylindrical first portion 34 attached to a radial flange portion 36. When assembled, ring first portion 34 is disposed between bushing first portion 24 and bore 14, and flange portion 36 is sealingly disposed between and against surface 18 and axial face 30, thereby sealing the assembly from leakage past bushing 20. Preferably, flange portion 36 is formed having annular corrugations 38 which are axially compressible.

Figure 4:
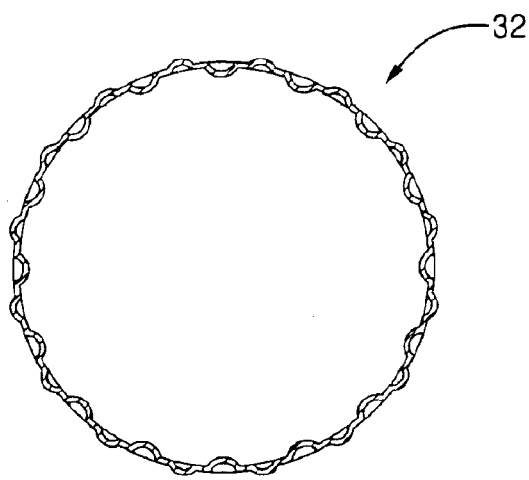
FIG. 4 is a cross-sectional view taken along line 4—4 in FIG. 3.
Figure 5:
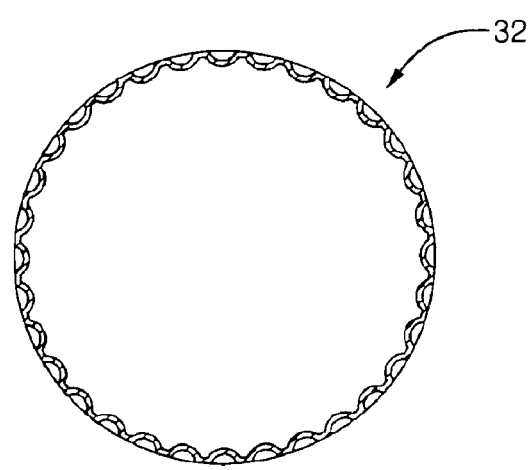
FIG. 5 is a cross-sectional view similar to FIG. 4 showing the dimples extending only inwardly.

Base portion 35 of first ring portion 34 is radially deformed into a pattern of dimples 40. Dimples 40 a may extend only outward from the base cylinder of portion 34 in a first embodiment as best seen in FIGS. 1 and 2; dimples 40b may extend only inward from base cylinder portion 34 in a second embodiment as best seen in FIG. 5; or, dimples 40a, 40b may extend both inward and outward from base cylinder portion 34 in a third embodiment. The third embodiment, as shown in FIGS. 3 and 4, is currently preferred. The dimples may be of any desired shape, for example, axially elongate as shown, round, triangular, or rectangular. Dimples may be continuously wave-like, or may be discrete, as shown, with non-deformed areas of the base cylinder between. The only requirement is that they be radially resilient over a short radial distance. Ring 32 is readily formed in known fashion as by magnaforming, deep drawing, or stamping.

The dimples 40 of the invention absorb the difference in thermal expansion of the valve body and the bushing while allowing the valve pintle to remain centered on the valve seat.

In assembly, ring 32 may be press-fit onto bushing portion 24 to form a bushing assembly 33 and then the bushing assembly press-fit into bore 14, or as desired the ring may be press-fit into the bore and the bushing then press-fit into the ring. In either case, the bushing is finally pressed axially of the valve body until seals are formed between the body surface and the ring flange and between the bushing flange and the ring flange.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A tolerance ring for radially positioning a bushing with respect to a bore in a valve body, said ring comprising:
    a) a cylindrical portion having a base portion and a plurality of dimples extending radially from said base portion; and
    b) a flange portion attached to said cylindrical portion for forming seals against said valve body and said bushing.

2. A ring in accordance with claim 1 wherein said dimples extend only radially outwardly from said base portion.

3. A ring in accordance with claim 1 wherein said dimples extend only radially inwardly from said base portion.

4. A ring in accordance with claim 1 wherein said dimples extend radially both inwardly and outwardly from said base portion.

5. A ring in accordance with claim 1 wherein said flange is formed into at least one annular corrugation.

6. A poppet bushing assembly, comprising:
    a) a poppet bushing having a first cylindrical portion; and
    b) a tolerance ring having a second cylindrical portion disposed on said first cylindrical portion, and having a plurality of dimples extending radially from said second cylindrical portion, and having a flange portion attached to said second cylindrical portion.

7. A poppet valve assembly comprising:
    a) a valve body having a bore;
    b) a valve pintle bushing disposed in said bore; and
    c) a tolerance ring disposed between said body and said bushing, said ring including
    a cylindrical portion having a base portion and a plurality of dimples extending radially from said base portion, and
    a flange portion attached to said cylindrical portion for forming a seal against said valve body and said bushing.

8. A poppet valve assembly in accordance with claim 7 wherein said valve is an exhaust gas recirculation valve.

* * * * *